United States Patent
MacPherson

(10) Patent No.: US 6,725,107 B2
(45) Date of Patent: Apr. 20, 2004

(54) ELECTRONIC SCOREKEEPING DEVICE AND SYSTEM THEREFOR

(75) Inventor: Ray MacPherson, Prince Edward Island (CA)

(73) Assignee: Hockeyline Inc., Prince Edward Island (CA)

( * ) Notice: Subject to any disclaimer, the term of this patent is extended or adjusted under 35 U.S.C. 154(b) by 307 days.

(21) Appl. No.: 10/011,482

(22) Filed: Dec. 11, 2001

(65) Prior Publication Data

US 2002/0138163 A1 Sep. 26, 2002

(30) Foreign Application Priority Data

Dec. 11, 2000 (CA) .............................................. 2328048

(51) Int. Cl.[7] ................................................. G06F 3/00
(52) U.S. Cl. ........................... 700/92; 273/459; 273/460
(58) Field of Search .......................... 273/108.56, 460, 273/459; 473/480; 340/323 R; 345/748; 700/92

(56) References Cited

U.S. PATENT DOCUMENTS

| | | | | |
|---|---|---|---|---|
| 4,480,833 A | * | 11/1984 | Barcelow et al. ...... | 273/108.56 |
| 4,956,775 A | * | 9/1990 | Klamer et al. .............. | 473/480 |
| 5,283,733 A | * | 2/1994 | Colley .................... | 340/323 R |
| 5,377,982 A | | 1/1995 | Villarreal, Jr. | |
| 5,648,752 A | * | 7/1997 | Alfrey ................... | 340/323 R |
| 5,681,108 A | * | 10/1997 | Miller ......................... | 700/92 |
| 5,949,679 A | | 9/1999 | Born et al. | |
| 6,012,995 A | * | 1/2000 | Martin ....................... | 473/459 |
| 6,041,266 A | * | 3/2000 | Nickerson .................... | 700/92 |
| 6,148,242 A | | 11/2000 | Descalzi et al. | |
| 2002/0015060 A1 | * | 2/2002 | Honjas ....................... | 345/748 |
| 2002/0044045 A1 | * | 4/2002 | Crookham et al. ..... | 340/323 R |

OTHER PUBLICATIONS

Internet Publication "Execmag" 1999–07 of Rudzinski, originally found at the URL http://www.unisys.com/execmag/1999–07/journal/atwork.htm.

* cited by examiner

*Primary Examiner*—Teresa Walberg
*Assistant Examiner*—Yveste Cherubin
(74) *Attorney, Agent, or Firm*—Sughrue Mion, PLLC

(57) ABSTRACT

An electronic scorekeeping device is disclosed which allows a user to electronically document data relating to events of a sports game. This data is transferred in real-time in a system according to the invention via a communications means to a central database. The central database may be coupled to a server computer which presents a web site whereby public users may access statistical information relating to a given sports game while the game is still in progress, as well as at and following the conclusion of the game. The web site may present archives of previously played games, and access thereto may be restricted by the use of a username and/or password. The data transfer to the database may be a live feed, or automatic transfers may be scheduled at predetermined time intervals. The device itself is customizable such that the data being gathered can be tailored to suit the specific sport being played. The user may further customize the menu-based screens displayed on the device in order to eliminate the prompting for any extraneous data that is not desired by the particular user.

32 Claims, 2 Drawing Sheets

US 6,725,107 B2

ELECTRONIC SCOREKEEPING DEVICE AND SYSTEM THEREFOR

FIELD OF THE INVENTION

The present invention relates to an electronic scorekeeping device for sports games. The invention also facilitates the timely collection of sports-related data and the processing and transmission of related statistics.

BACKGROUND OF THE INVENTION

Traditionally, scorekeepers for various sports have kept track of the score of a game as well as numerous additional statistics related to various aspects of the game on specialized score sheets. These score sheets contain sections for recording the appropriate events of the game such that elaborate statistics may be compiled following the game, or even as the game progresses. These statistics may relate, not only to the specific game being played, but may also extend to an entire playing season or part thereof and may highlight trends relating to a particular player, team, or other category of game related-statistic.

Prior art solutions exist which enable the use of electronic means to accomplish what has traditionally been accomplished with a paper score sheet. For example, U.S. Pat. No. 5,377,982, issued Jan. 3, 1995 to Villarreal, Jr., teaches a portable electronic scorekeeping device. This device permits a user to electronically document and record the plays and scoring in a game. The information is manually input into the device by the user via a keyboard. This information is then used to automatically update statistics for different players involved in the game. A hard disk drive allows the bulk storage of player data and play events over several games. Interface ports permit the device to be connected to, and thereby control, a publicly viewed scoreboard.

There are, however, many drawbacks to such prior art solutions. During the game, the statistics related to the events of the game are only made available to those in attendance. Once the game is over, the statistics compiled by such prior art devices are only available to the operator of the device or to those who obtain a printout from the device, and not to the general public. In a situation where the game is played at the professional level, such information may be made available following the conclusion of the game. However, this requires an extra step of further entering the data in a separate system dedicated to the delivery of such information. Moreover, the relevant information is not readily available for games at an amateur level, although there is an increasing demand for such information. There is, therefore, a need for a solution which will overcome the shortcomings of the prior art.

SUMMARY OF THE INVENTION

The present invention advantageously provides an electronic scorekeeping device for gathering, calculating and distributing statistical information related to a sports game whereby the information can be transferred in real-time to a central database and may consequently be made concurrently available to the general public.

According to an aspect of the present invention, there is provided an electronic scorekeeping device for gathering, processing and distributing statistical information related to a sports game, comprising a processor input means coupled to said processor for inputting data related to events of said sports game in real-time memory means coupled to said processor for storing such inputted data display means coupled to said processor for facilitating the entry of such data by a user information transfer means for transferring statistical information based on such inputted data to a central database via communication means wherein the display means displays a plurality of hierarchical menu-based screens that may be customized by the user to reflect desired data that is to be gathered for said sports game.

According to another aspect of the present invention, there is provided an electronic scorekeeping device for gathering, processing and distributing statistical information related to a sports game, comprising a processor input means coupled to said processor for inputting data related to events of said sports game in real-time memory means coupled to said processor for storing such inputted data display means coupled to said processor for facilitating the entry of such data by a user information transfer means for transferring statistical information based on such inputted data to a central database via communication means and clock interface means for coupling said processor with a game clock wherein the coupling between the clock interface means and the game clock allows for bi-directional communication.

According to yet another aspect of the present invention, there is provided a system for gathering, processing and distributing statistical information related to a sports game, comprising an electronic scorekeeping device a central database communication means for effecting communication between said electronic scorekeeping device and said central database wherein said electronic scorekeeping device comprises a processor input means coupled to said processor for inputting data related to events of said sports game in real-time memory means coupled to said processor for storing such inputted data display means coupled to said processor for facilitating the entry of such data by a user and information transfer means for transferring statistical information based on such inputted data to a central database via communication means wherein the display means displays a plurality of hierarchical menu-based screens that are customized to reflect the desired data that is to be gathered for said sports game and wherein the user is able to further customize the menu-based screens in order to determine which specific data is to be collected at said sports game.

BRIEF DESCRIPTION OF THE DRAWINGS

Embodiments of the present invention will be further described with reference to the accompanying drawings in which.

DETAILED DESCRIPTION OF THE INVENTION

Figure 1:
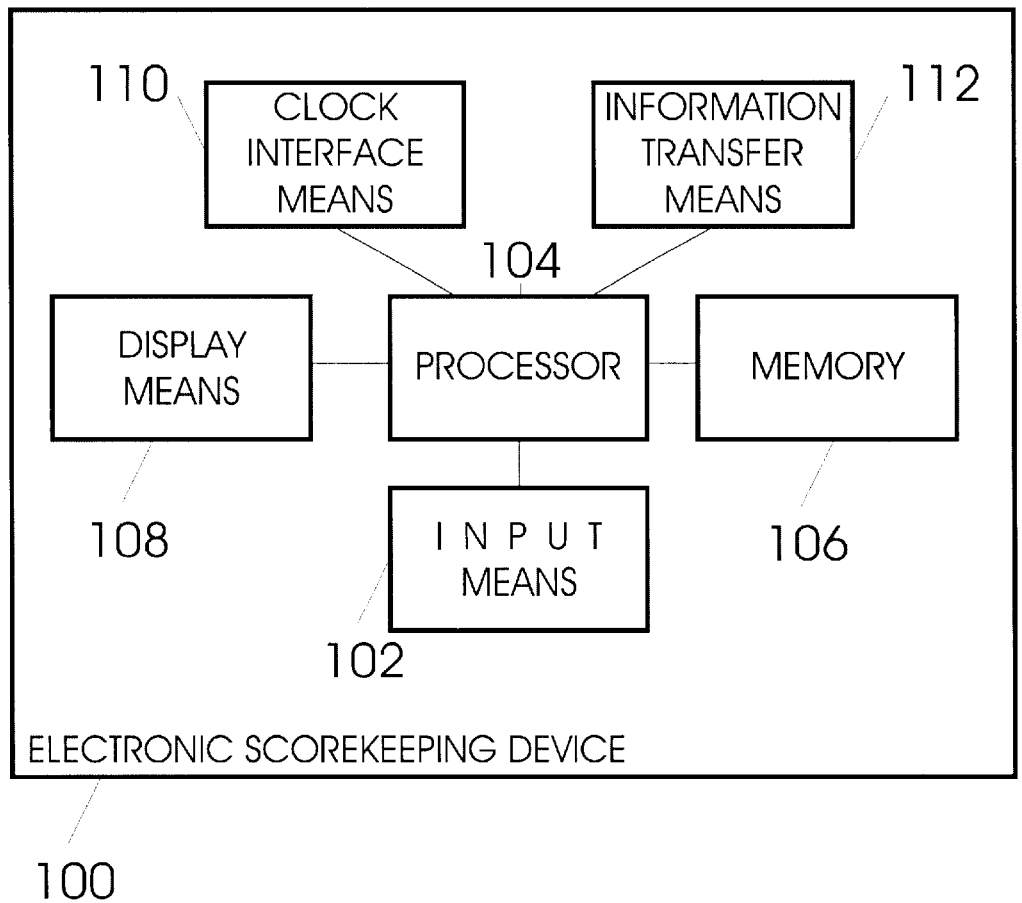
FIG. 1 illustrates a block diagram of a preferred embodiment of the device of the present invention.

FIG. 1 illustrates a block diagram of an embodiment of the device of the present invention. Data related to a game being played may be inputted via input means 102 into an electronic scorekeeping device 100. The input means 102 may be a keyboard, a computer mouse, a touch display screen or any such input device known in the art or any combination thereof. In the case of a touch display screen, the screen may function both as a display means and an input means. In the case of a keyboard or mouse, the operation thereof would normally be carried out in conjunction with display means 108, and/or a computer screen or other electronic screen. A processor 104 provides all computational functions related to the calculation of various statistics based on the statistical data input during the game. Such information is stored in memory 106. Although the processor 104 and memory 106 are preferably provided as separate units in the specialized device 100, a general purpose computer may be alternatively used to provide the processor and memory as part of the device. Display means 108 is used to prompt the user for various types of input related to the progress of the game. Such data is then inputted during the game via the appropriate input means 102. As mentioned earlier, a touch display screen can be used to integrate an input means into the display means.

A clock interface means 110 is used to provide communication between the electronic scorekeeping device and the game clock (not shown in FIG. 1). The game clock may also have expanded functions such as are associated with sophisticated arena scoreboards known in the art. Communication between the game clock, the scoreboard and the electronic scorekeeping device may be bi-directional. In such an embodiment, not only may time information from the game clock be transferred to the electronic scorekeeping device, but statistical information may also be transferred from the electronic scorekeeping device to the game clock for display on an arena scoreboard that is adapted to display such information. Information transfer means 112 enables the transfer of statistical information from the electronic scorekeeping device 100 to a central database (not shown in FIG. 1) via a communication means. The operation of the information transfer means will be explained in further detail with reference to FIG. 2.

Figure 2:
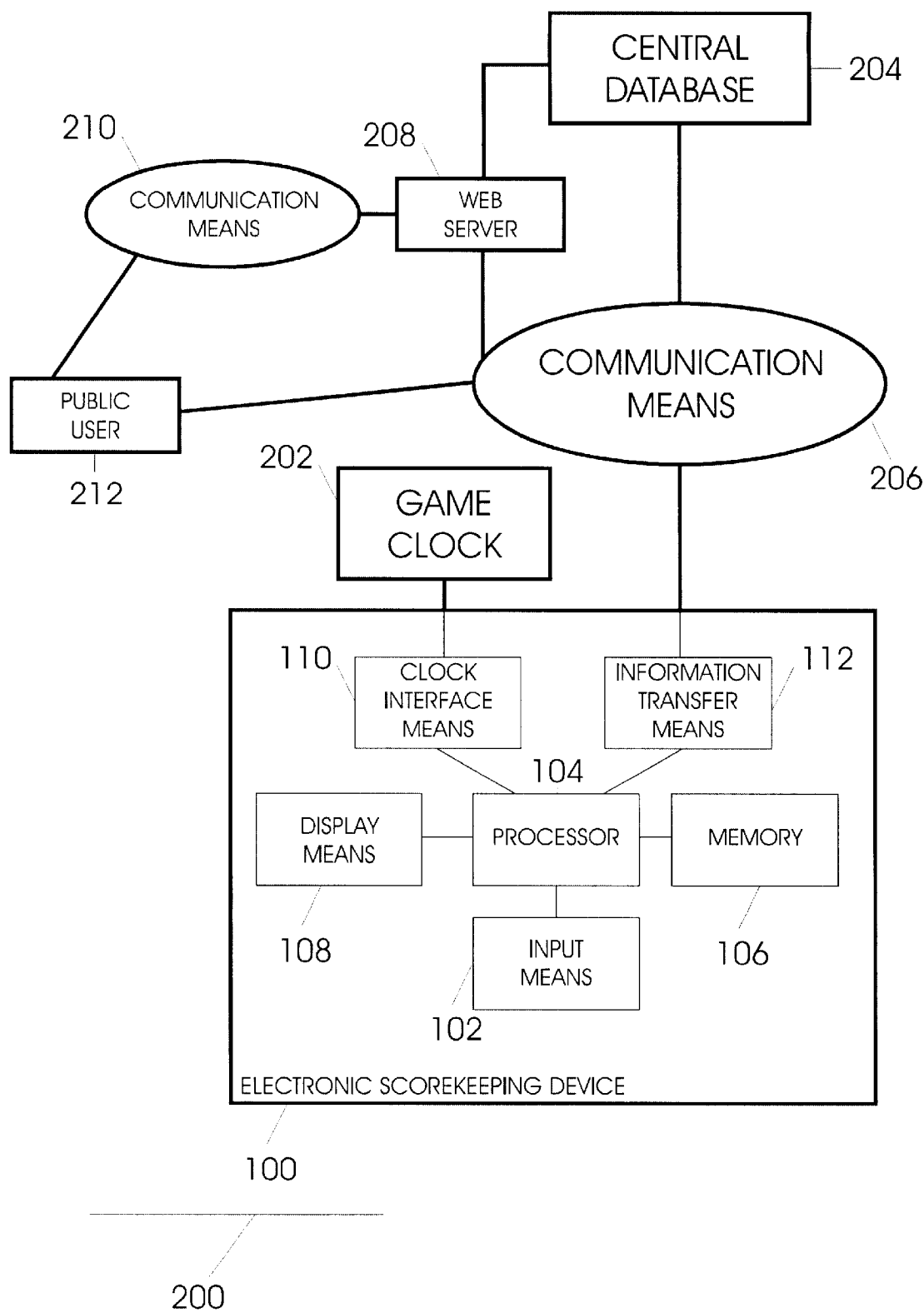
FIG. 2 illustrates a block diagram of a preferred embodiment of a system incorporating the device of FIG. 1.

FIG. 2 shows a preferred embodiment of a system 200 that incorporates the electronic scorekeeping device 100 of the present invention. The interconnection between game clock 202 and clock interface means 110 is readily seen in FIG. 2. Such an interconnection can be effected by wireless or wired means as is well known in the art. The transfer of information between electronic scorekeeping device 100 and the central database 204 is handled by information transfer means 112. The information is passed through information transfer means 112 to communication means 206 for transmission to the central database 204. In a preferred embodiment, the information transfer means 112 would include means to transmit information in a fast and efficient manner, such as by a network interface card or a radio frequency (RF) modem. In alternate embodiments, the information transfer means is further adapted to import other data from an external source, such as the Internet or another electronic scorekeeping device. The communication means 206 may be a wired or wireless connection and may be either a dedicated or shared connection. In a preferred embodiment, the communications means would be the Internet, although any public or private data network or public switched telephone network could be employed for data transfer.

Although only one electronic scorekeeping device is shown in FIG. 2, it is to be understood that a plurality of such devices may be used at various locations, each of which may transfer information via communications means to the central database.

Furthermore, in an alternate embodiment, a plurality of electronic scorekeeping devices may be used to gather data at the same game with one device being a master device and the others being slave devices with respect to the master device. Although each one of these devices will be able to transmit game information to the central database in this alternate embodiment, normally only the master device is able to perform this transmission in real-time.

The device is normally able to withstand temperatures well outside normal room temperatures, including, for instance, rinkside temperatures. The device is also able to withstand certain physical stresses.

Data Transmission

Game statistics may be periodically uploaded from the electronic scorekeeping device to a central database. Information stored in the central database 204 is made available to the general public by way of web server 208. A plurality of public users 212 may access the web server by the communication means 206 or by communication means 210. Similar to communication means 206, communication means 210 may be a wired or wireless connection and may be either a dedicated or shared connection. In a preferred embodiment, the communications means 210 would also be the Internet, with public users 212 connecting to the Internet in any of the manners known in the art.

In a preferred embodiment, the web server 208 may host a central web site that provides streamlined access to up-to-the-minute information of games wherein the electronic scorekeeping device is employed. Access to the information available at the central web site, or certain parts thereof, may be optionally regulated by the use of usernames and/or passwords, or any other security measure. A public user may obtain a username and password following registration with the central web site, or by any other appropriate arrangement.

In an alternate embodiment, the web server 208 may provide a service to an external web site (not shown in the figures). The external web site may be provided at a location external to the web server 208 and may be administered by any party, such as a party interested in the affairs of a particular hockey association, league or team. That party would be responsible for the maintenance and administration of the external web site. The web server 208 would provide the external web site with access to information contained in the central database 204. In this manner, the external web site may provide interested web surfers with up-to-date statistical information without having to invest in the infrastructure and equipment necessary to provide such services.

The central web site of the preferred embodiment provides access to statistical information in an organized manner. Categories such as Association, League, Team, and Player may be used in order to locate the desired statistics. The central web site may alternatively provide access to news stories that are related to the various games, teams, players, leagues and associations, in addition to up-to-the-minute statistical information. Furthermore, registered users will be able to create a personalized page on the central web site. This personalized page can be customized in order to provide immediate access to the public user's preferred information.

With respect to the electronic scorekeeping device itself, the device is configured such that game statistics may be periodically uploaded to the central database. The following settings can be configured for this transfer of information: enable live feed, upload interval, include game time, and FTP location.

The "enable live feed" option allows the user to select whether the live game feed to the central database is to be active or inactive. An Internet connection is required in order for the live feed to function. When enabled, the live feed allows statistical information to be transferred in real-time to the central database. The information in the database can be immediately posted on the central web site so that interested parties can view desired statistics while the game is still in progress.

The "upload interval" option allows the user to configure the time interval between automatic uploads. The user will be given a selection of appropriate time intervals from which to choose.

The "include game time" option allows the user to select whether to include the game time in the uploads or not. If the user wants to upload the current game time, then the current game time will be included with each upload. If the application is connected to the game clock, this information can be uploaded directly. If it is not connected to the game clock, the time keeper will have to enter the game time manually for each live update.

The "FTP location" option allows the selection of a file transfer protocol (FTP) server to which the information is to be sent. The default will be set to the central database. However, this can be set such that the information is sent to another location should the need arise.

Also available to the user is a "Setup Clock Connection" option. This will permit the user to configure the interface with the game clock. Required frequency settings for this interface may be set in accordance with information which may be acquired from the manufacturer of the particular scoreclock being used in each individual setup.

A further functionality is the "Print a Game Sheet" option. This function will print a hard copy of the game sheet on a printer that comes bundled with the electronic scorekeeping device. This printer may be a commercial, off-the-shelf unit which will be used in conjunction with the device. The game sheet will contain a summary of all of the information associated with that game. It will contain all of the information that is usually contained in a traditional game sheet.

In accordance with an embodiment of the present invention, the collection and computation of a wide range of data and statistics related to a sports game are enabled. Although the remaining description of this embodiment of the present invention will be described in detail with respect to the game of hockey, it should be noted that data related to other sports may also be recorded, and statistical information can be processed and transmitted using this device. For example, sports such as softball, soccer, baseball, basketball, and football, can be scored by modifying the displays on the device as well as the software which provides the prompts and system options to the user. Simple equations and relationships for statistics relating to other sports are readily obtainable and the device or system of the present invention may easily be modified to accommodate these changes.

The electronic scorekeeping device of the present invention provides, in a preferred embodiment, a main menu which presents the options available to the user. These options are: Setup a Game, Enter Game Statistics, Delete Game Statistics, Import Game Statistics, Application Setup, End of Game Statistics, and Exit.

Setup a Game

Before the game actually occurs, the user may be required to set up the device of the present invention. During the setup process, the following information can be stored: Game Date, Game Time, Location, Home Team Name, Away Team Name, Home Team Roster, Away Team Roster, and League. It is possible for the user to obtain such information by either selecting a game file or importing a team file. A game file would be selected from an external data source (such as the Internet) and downloaded prior to the game. The game file will contain all of the pertinent information for the game (teams, league, rosters, game location, etc.) In an embodiment of the present invention, the game file may be located at the central web site on a specific game page for that particular game. The user may simply select the desired game on the web site and choose to download this game file to the device.

If there is no game file available on the Internet, the user has the option of importing a team file from another data source. The team file contains all of the information pertaining to a specific team (team name, league, age group, roster, etc.) The team roster is a list of the players on the team. The user can select the players who will be playing that particular game and enter any players that are missing. The following information will be stored for any roster addition or existing member of the roster: Player First Name, Player Last Name, Player Number, Player Date Of Birth, Player Position. Once the above information is entered, the user can select to enter home team statistics, away team statistics, or both. The software will generate a game file name automatically based on the home team, away team, league name, date, time and machine name. The game file will hold all of the game information and statistics.

Enter Game Statistics

Once the setup has been completed, the user can proceed to the main statistics screen. The main statistics screen will vary in look depending on whether the user is tracking a single team's statistics or both teams' statistics. If one team is being tracked then the screen will contain a single column of statistic buttons; if both teams are being tracked, it will contain two columns of statistic buttons. The following buttons will be contained in each of the columns: Goal, Penalty, Shot, Hit, Face-off, Turnover, Change/Remove Goalie, +/−, Undo Last Statistic, Change Period, Exit.

A list of the players for each team and a diagram of the hockey rink will enable the user to fill in pertinent information by clicking on appropriate players or locations on the rink. No data will have to be entered via a keyboard at this point. This will ensure that the data can be entered both accurately and efficiently.

When a goal is scored, the user presses the "Goal" button and the following screens will appear, awaiting user input: Time and Period of Goal, Player Who Scored, Player Who Assisted #1, Player Who Assisted #2, Where the Shot Was Taken From, Where the Goal Went Into the Net, Reason for the Goal, and Return to Statistics Menu.

When a penalty occurs, the user presses the "Penalty" button and the following screens will appear, awaiting user input: Time and Period of Penalty, Type of Penalty, Player Who Got the Penalty, Duration of Penalty.

When a shot is taken, the user presses the "Shot" button and the following screen will appear, awaiting user input: Player Who Took the Shot. When a hit is given on the ice, the user presses the "Hit" button and the following screen will appear, awaiting user input: Player Who Performed the Hit.

When a face-off occurs, the user presses the "Face-off" button and the following screens will appear, awaiting user input: Region In Which the Face-off Occurred, Player Who Won the Face-off, Player Who Lost the Face-off, Where the Puck Was Pulled To.

When a turnover occurs, the user presses the "Turnover" button and the following screens will appear, awaiting user input: Player Who Turned the Puck Over, Region From Which the Player Passed the Puck, Region In Which the Pass Was Turned Over, Type of Turnover.

Whenever a goalie enters or exits the game, the user will press the "Change/Remove Goalie" button. The user will remove the goalie from the game and enter the time and period that the goalie left. The user can then select the other goalie that will enter the game, or select none if the team is leaving an empty net.

The "+/−" menu option will bring up a listing of the team roster. Beside the team roster will be a plus button and a minus button. By clicking on one of these two buttons, the user will either increment or decrement the players' plus-minus statistic. The value of the plus-minus statistic is incremented if the player's team scores a goal while the player is on the ice, and is decremented if the opposing team scores a goal while the player is on the ice.

The "Undo Last Statistic" button allows the user to undo (delete) the last statistic that was entered. The user may be prompted to confirm this operation.

The "Change Period" button allows the user to change the current period. To maintain statistical validity, the period on the device must match that of the game. When the user changes the period, the length of the period must also be entered.

Delete Game Statistics

At any time during or after the game, the user can elect to delete one or more game statistics. This menu option will bring up a listing of all game statistics. The user will be able to scroll through the statistics, select one or more, and then delete it or them. The user can then return to the Enter Game Statistics menu option and enter statistics anew. A command button will be also provided to allow the user to delete the last statistic that was entered.

Import Game Statistics

The Import Game Statistics option is used primarily when multiple electronic scorekeeping devices are used to collect data at the same game. In such a case, the user will be able to import game statistics gathered from another electronic scorekeeping device into the master game file. The application will prompt the user to select the game file to import. After the user selects the game file, an option is provided in order to select the type of statistic to be imported (Goals, Assists, Penalties, Shots, etc.) The user then clicks an Import button, which will help ensure that duplicate statistics were not gathered. The application will then show a progress bar indicating the progress of the importation process.

Should an erroneous importation occur, the user has the option to delete the last importation performed on the current game file. This will help alleviate potential importation errors.

Application Setup

The Application button on the main menu will launch the Application Setup window. This screen will allow the user to configure which statistics are gathered by the electronic scorekeeping device. It will allow for the device to be configured in such a way as to gather either only a single statistic or multiple statistic types. For instance, in a system wherein a plurality of electronic scorekeeping devices are used, it is possible that only statistics relating to Shots will be gathered on a particular device. This setup will also allow the user to block out any sub-section of a statistic. For example, a team may want to keep track of face-offs won/lost, but not which circle it was in; the device, in this case, will not display that particular screen to the user and the statistics gathering process will therefore be streamlined.

According to a further embodiment of the present invention, every electronic scorekeeping device has the option of being assigned a user-defined name. This will help track where specific game files have come from and distinguish them from each other. The device's user-defined name will be appended onto each game file created by that particular electronic scorekeeping device.

End Game Statistics

The End Game Statistics option will allow the user to enter any statistics that are only available at the end of the game. The following end of game statistics will be made available to the user: Goalie Shut-out (yes/no); Goalie Win, Loss, Tie; Game Comments; and Game Notes.

Exit

The Exit option will allow the user to exit the application.

Numerous modifications, variations and adaptations to the present invention are possible without departing from the teachings above and as defined by the scope of the claims appended hereto.

I claim:

1. An electronic scorekeeping device for gathering, processing and distributing statistical information related to a sports game, comprising:

a processor;

input means coupled to said processor for inputting data related to events of said sports game in real-time;

memory means coupled to said processor for storing such inputted data;

display means coupled to said processor for facilitating the entry of such data by a user;

information transfer means for transferring statistical information based on such inputted data to a central database via communication means;

wherein the display means displays a plurality of hierarchical menu-based screens that may be customized by the user to reflect desired data that is to be gathered for said sports game.

2. A device according to claim 1 wherein the transfer of statistical information is performed automatically.

3. A device according to claim 2 wherein the user is able to configure the time interval between automatic transfers.

4. A device according to claim 1 wherein the information transfer means is adapted to transfer statistical information to a location other than the central database.

5. A device according to claim 4 wherein the information transfer means is further adapted to import other data from an external source.

6. A device according to claim 5 wherein the external source is the Internet.

7. A device according to claim 5 wherein the external source is another electronic scorekeeping device.

8. A device according to claim 1 wherein the central database is further coupled to a server computer that provides access to the information in the central database to a plurality of public users.

9. A device according to claim 8 wherein the server computer hosts a web site which provides access to information in the central database, and optionally provides access to additional information furnished by a web site operator.

10. A device according to claim 8 wherein the server computer provides a service to an external web site such that the external web site is given access to information in the central database.

11. A device according to claim 8 wherein the public users' access to the information in the central database is regulated by a security measure.

12. A device according to claim 11 wherein said security measure comprises the use of a username and a password.

13. A device according to claim 1 further comprising clock interface means for coupling said processor with a game clock.

14. A device according to claim 13 wherein the coupling between the clock interface means and the game clock allows for bi-directional communication.

15. An electronic scorekeeping device for gathering, processing and distributing statistical information related to a sports game, comprising:

a processor;

input means coupled to said processor for inputting data related to events of said sports game in real-time;

memory means coupled to said processor for storing such inputted data;

display means coupled to said processor for facilitating the entry of such data by a user;

information transfer means for transferring statistical information based on such inputted data to a central database via communication means; and clock interface means for coupling said processor with a game clock;

wherein the coupling between the clock interface means and the game clock allows for bi-directional communication.

16. A system for gathering, processing and distributing statistical information related to a sports game, comprising:

an electronic scorekeeping device;

a central database;

communication means for effecting communication between said electronic scorekeeping device and said central database;

wherein said electronic scorekeeping device comprises:

a processor;

input means coupled to said processor for inputting data related to events of said sports game in real-time;

memory means coupled to said processor for storing such inputted data;

display means coupled to said processor for facilitating the entry of such data by a user; and information transfer means for transferring statistical information based on such inputted data to a central database via communication means;

wherein the display means displays a plurality of hierarchical menu-based screens that are customized to reflect the desired data that is to be gathered for said sports game; and wherein the user is able to further customize the menu-based screens in order to determine which specific data is to be collected at said sports game.

17. A system according to claim 16 wherein the device further comprises clock interface means for coupling said processor with a game clock.

18. A system according to claim 17 wherein the coupling between the clock interface means and the game clock allows for bi-directional communication.

19. A system according to claim 16 wherein the transfer of statistical information is performed automatically.

20. A system according to claim 19 wherein the user is able to configure the time interval between automatic transfers.

21. A system according to claim 16 wherein the information transfer means is adapted to transfer statistical information to a location other than the central database.

22. A system according to claim 21 wherein the information transfer means is further adapted to import other data from an external source.

23. A system according to claim 22 wherein the external source is the Internet.

24. A system according to claim 22 wherein the external source is another electronic scorekeeping device.

25. A system according to claim 16 wherein the central database is further coupled to a server computer that provides access to the information in the central database to a plurality of public users.

26. A system according to claim 25 wherein the server computer hosts a web site which provides access to information in the central database, and optionally provides access to additional information furnished by a web site operator.

27. A system according to claim 25 wherein the server computer provides a service to an external web site such that the external web site is given access to information in the central database.

28. A system according to claim 25 wherein the public users' access to the information in the central database is regulated by a security measure.

29. A system according to claim 28 wherein said security measure consists of the use of a username and a password.

30. A system according to claim 1 wherein the central database is arranged to receive data from a plurality of electronic scorekeeping devices, each of said devices being located at a separate sports game.

31. A system according to claim 16 wherein a plurality of electronic scorekeeping devices is provided for gathering game-related data at said sports game, and wherein
 a particular device of said plurality of electronic scorekeeping devices is a master device; and
 the remainder of said plurality of electronic scorekeeping devices are slave devices with respect to said master device.

32. A plurality of systems according to claim 31 wherein each of said systems may communicate with the central database.

* * * * *